United States Patent [19]

Ekanadham et al.

[11] Patent Number: 6,085,295
[45] Date of Patent: *Jul. 4, 2000

[54] METHOD OF MAINTAINING DATA COHERENCY IN A COMPUTER SYSTEM HAVING A PLURALITY OF INTERCONNECTED NODES

[75] Inventors: Kattamuri Ekanadham, Mohegan Lake; Beng-Hong Lim, Wappingers Falls; Pratap Chandra Pattnaik, Ossining; Marc Snir, Briarcliff Manor, all of N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/954,496

[22] Filed: Oct. 20, 1997

[51] Int. Cl.[7] .................................................. G06F 12/16
[52] U.S. Cl. .......................... 711/145; 711/121; 711/143; 711/144; 711/153; 711/156; 711/173; 709/214; 709/215; 709/218; 709/219; 710/129; 710/131
[58] Field of Search ..................... 711/121, 141, 711/144, 145, 148, 143, 153, 156, 173; 709/214, 218, 219, 215; 710/129, 131

[56] References Cited

U.S. PATENT DOCUMENTS

| | | | |
|---|---|---|---|
| 5,535,365 | 7/1996 | Barriuso et al. | 711/155 |
| 5,749,095 | 5/1998 | Hagersten | 711/141 |
| 5,787,476 | 7/1998 | Laudon et al. | 711/141 |
| 5,829,035 | 10/1998 | James et al. | 711/141 |

*Primary Examiner*—Hiep T Nguyen
*Attorney, Agent, or Firm*—Douglas W. Cameron

[57] ABSTRACT

A method of providing coherent shared memory access among a plurality of shared memory multiprocessor nodes. For each line of data in each of the nodes, a list of those processors of the node that have copies of the line in their caches is maintained. If a memory command is issued from a processor of one node, and if the command is directed to a line of memory of another node, then the memory command is sent directly to an adapter of the one node. When the adapter receives the command, it forwards the command from the one adapter to another adapter of the other node. When the other adapter receives the command, the command is forwarded to the local memory of the other node. The list of processors is then updated in the local memory of the other node to include or exclude the other adapter depending on the command. If the memory command is issued from one of the processors of one of the nodes, and if the command is directed to a line of memory of the one node, then the command is sent directly to local memory. When the local memory receives the command and if the adapter of the node is in the list of processors for a line associated with the command and if the command is a write command, then the command is forwarded to the adapter of the one node. When the adapter receives the command, the command is forwarded to remote adapters in each of the remote nodes which have processors which have cache copies of the line. Finally, when the latter remote adapters receive the command, the command is forwarded to the processors having the cache copies of the line.

7 Claims, 8 Drawing Sheets

METHOD OF MAINTAINING DATA COHERENCY IN A COMPUTER SYSTEM HAVING A PLURALITY OF INTERCONNECTED NODES

DESCRIPTION

1. Technical Field

This invention relates to a method of providing cache coherence in a shared memory system composed of a network of multiprocessor nodes.

2. Description of the Prior Art

A shared-memory multiprocessor system, comprised of a plurality of processing nodes with memory and caches, provides system-wide access to the memory in the system. It is imminent that each node of such parallel systems in the near future is a small cache-coherent multiprocessor, e.g, a symmetric multiprocessor (SMP), that consists of a small number (8 to 16) of slots connected by a bus or switch. Each slot can be occupied by a processor or a memory module. Each processor in the node can access any memory location in the node.

Technology considerations limit the size of an SMP node to a small number of processors. A method for building a shared-memory multiprocessor with a larger number of processors is to connect a number of SMP nodes with a network, and provide an adapter to extend the SMP's memory across the SMP nodes (see FIG. 1). Existing adapter designs plug into the memory bus of bus-based SMP nodes and collectively provide shared memory across the system, so that any processor in any node can access any location in any memory module in the system. Resources within a node are termed local and resources on other nodes are termed remote.

The adapter maintains a directory of all nodes sharing a line and monitors local accesses to the line in order to ensure coherence across nodes. On bus-based SMPs, the monitoring is straightforward. All address transactions appear on the bus and the adapter can snoop and respond to them. Thus, it is possible to design the adapter without having to make any changes to the SMP hardware, provided that the adapter can be connected to the bus as a master/slave device.

However, as the size and speed of an SMP node grows, technology limitations force the transition from bus-based to switch-based interconnects for both address and data transactions within the node. The design of an adapter for switch-based systems is complicated by the fact that a switch-based system uses a point-to-point interconnection that, unlike a bus, does not allow an adapter to observe all address transactions. In a switch-based SMP, the memory M maintains a directory 26. For each line 25 the directory keeps a list 24-x of the processors within the node that have cached copies of the line (see FIG. 2), where x is an integer between 1 and n, where n is the number of lines 25. See for example one of the lines 25 and its list 24-4 at the bottom of FIG. 2. It is understood that memory M can be any one of the memories M1 through MN.

Each processor communicates directly with the memory via the switch. In turn, the memory sends appropriate messages only to processors that need to be involved in the cache coherence protocol, and the memory has no knowledge of the adapter.

There is, therefore, a need for an adapter which extends shared memory access across multiple switch-based multiprocessor nodes. Such an adapter must not rely on a broadcast of memory commands within a multiprocessor node, and must not require changes to the existing memory controller of a multiprocessor node.

SUMMARY OF THE INVENTION

It is therefore an objective of this invention to provide a solution to the problem of providing shared-memory access across multiple switch-based SMP nodes.

The invention comprises an adapter to extend cache-coherent memory access across SMP nodes, and a method for using the memory system of a switch-based SMP node to interface to the adapter.

The key concepts in the adapter design are:

All communications between the processors, the memories and the adapters are made point to point without the need for broadcasts within the SMP node.

In a node where a line is mapped onto the node's memory, the adapter acts as a proxy processor representing all the processors outside the node that share the line. More specifically, when a remote processor issues a memory command to a local memory, the remote adapter at the remote processor's node, forwards the memory command to the local adapter, which is responsible for insuring that the command is executed at the local memory.

In a node where a remote line is brought into the cache of a processor, but not into the node's memory, the adapter acts as a proxy memory representing the remote memory that the line is mapped onto. More specifically, when a memory command is issued from a local processor to a remote memory, the memory command is directed to the adapter which is responsible for insuring that the command is executed at that remote memory.

The adapter is versatile enough to be used for either CC-NUMA (Cache Coherent Non Uniform Memory Access) and S-COMA (Simple Cache Only Memory Architecture) systems.

By appearing as either a local processor or a local memory, the adapter uses the local SMP coherence protocol within a node to accomplish the above tasks, without any changes to the memory controllers.

In situations where the memory controller is limited in the amount of storage it can use for the directory and must employ a dynamic allocation scheme for the directory entries, an extension of this invention involves a modification to the memory controller that overcomes the the storage limitation of the memory controller.

Accordingly, this invention provides coherent shared memory access across a number of interconnected multiprocessor nodes. With this invention each line of data in each memory of the node maintains a list of processors of the node that have copies of the line in their caches. When a memory command is issued from one of the processors of a node to a memory of another node, the command is directed to an adapter of the issuing node. The adapter of the issuing node then receives the command and forwards the command to the adapter at the remote node. When the adapter at the remote node receives the command, it then forwards the command to its local memory, which then updates its list of processors to include or exclude the adapter. However, if the memory command is issued from a processor to a local memory then the command is simply forwarded directly to that local memory. When that local memory receives the command and if an adapter is in the list of processors for the line in the memory command, then the command is forwarded to that adapter. The adapter then forwards the command to the other adapters of remote nodes which have cache copies of the line corresponding to the command. If the adapter is not found in the list, then the memory proceeds in accordance with the standard SMP protocol.

DESCRIPTION OF THE PREFERRED EMBODIMENT

Figure 1:
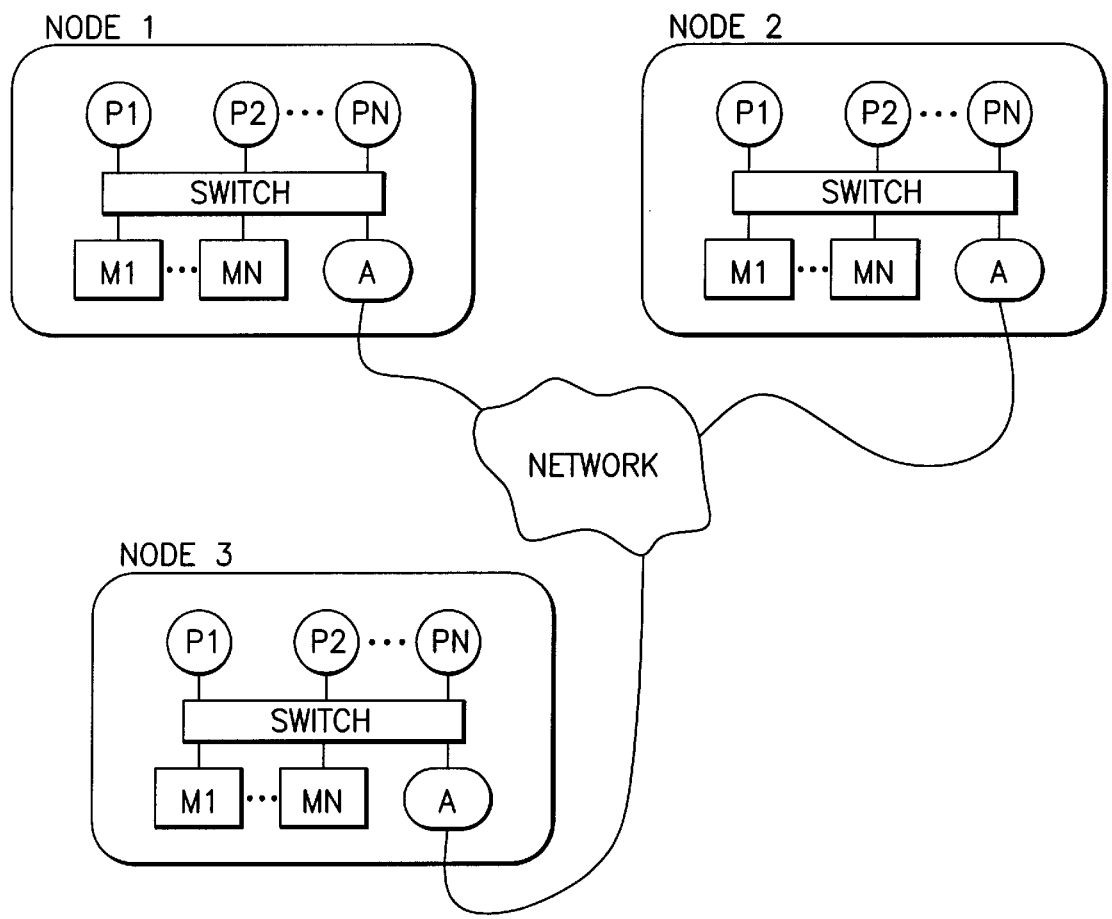
FIG. 1 schematically illustrates the shared memory multiprocessor system composed of multiple SMP nodes connected via a network.
Figure 2:
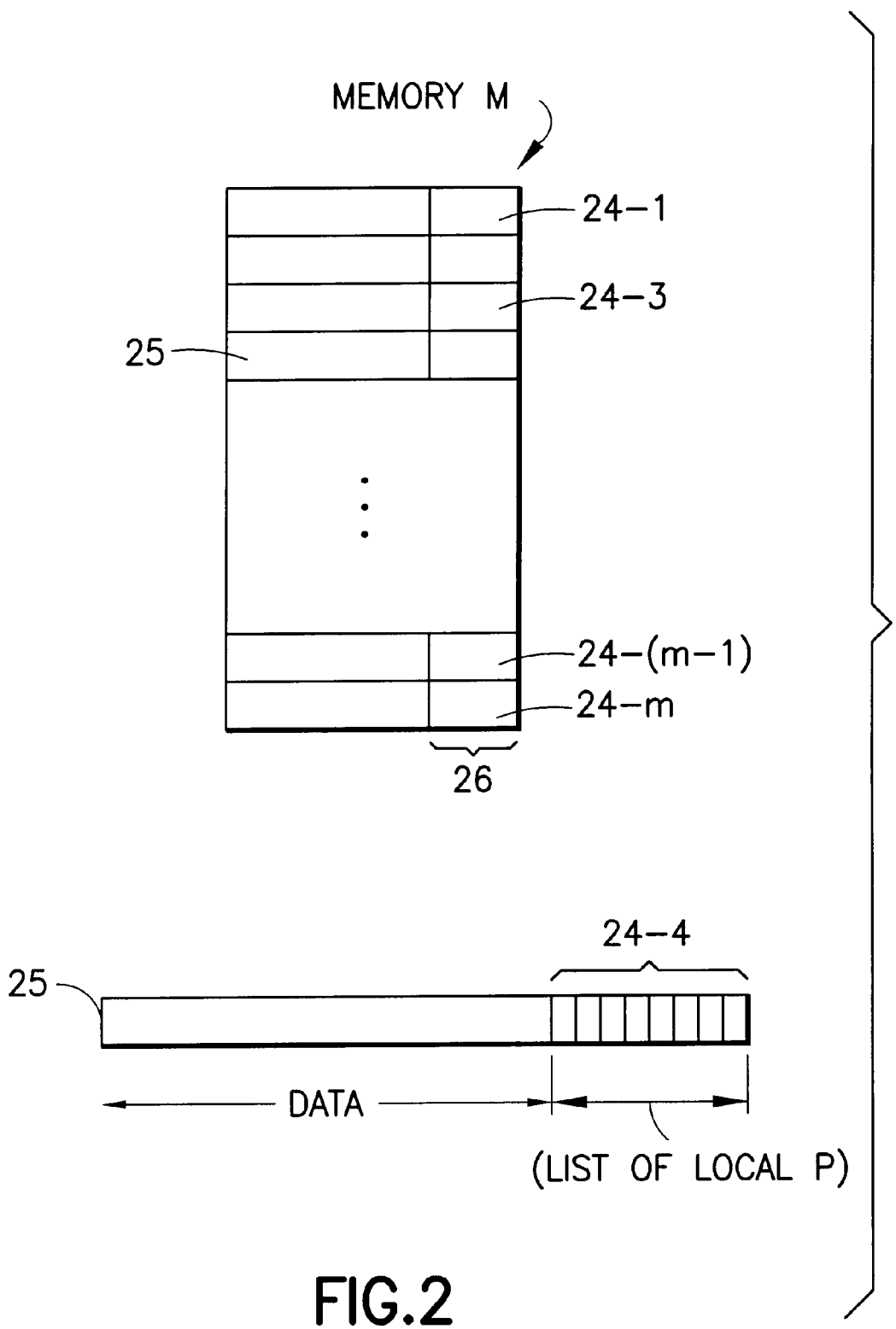
FIG. 2 schematically illustrates a memory module in a switch-based SMP, composed of a set of lines and a directory that maintains a list of processors sharing the line within the SMP.

The preferred embodiment of our system that is based on a network of switch-based SMP nodes with an adapter attached to each node. FIG. 1 illustrates a high-level diagram of such a multiprocessing system. Each node has a plurality of processors P1, P2, . . . , PN interconnected to each other by a switch (SW). The switch also interconnects the memory modules M1, M2, . . . , MN and adapters A. The nodes in turn, are connected to each other through a network as shown.

The processors and memories maintain cache coherence of data accesses within the SMP node.

Figure 3A:
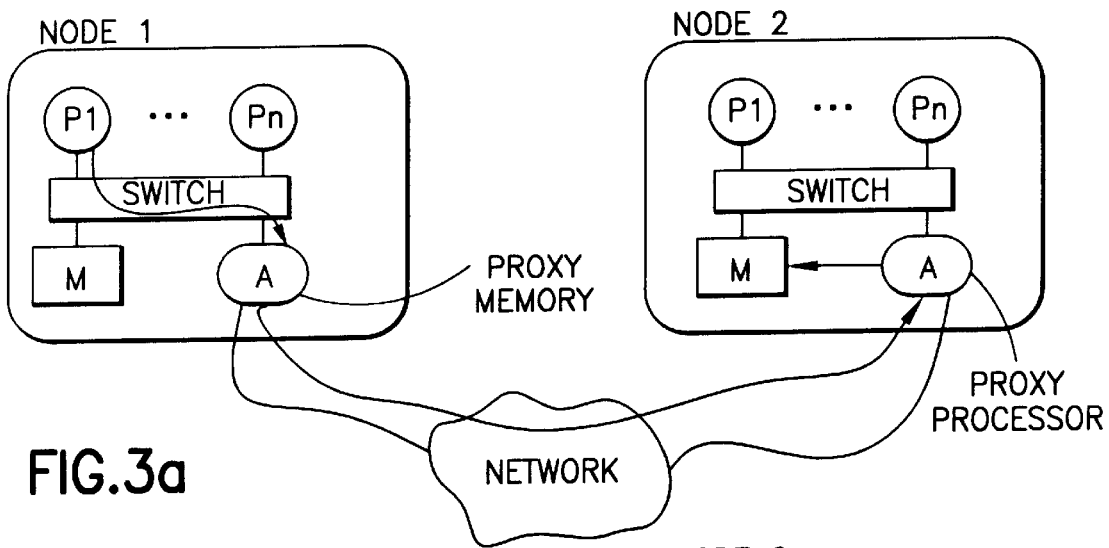
FIGS. 3A–3C are schematically illustrates several memory access scenarios in the system where the adapter acts either as a proxy processor or a proxy memory.
Figure 3B:
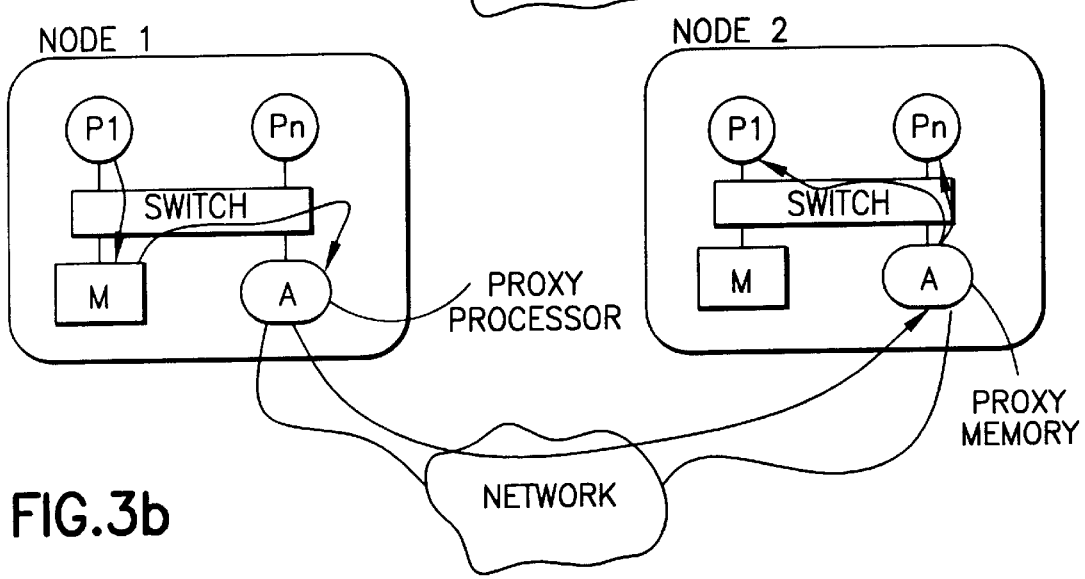
Figure 3C:
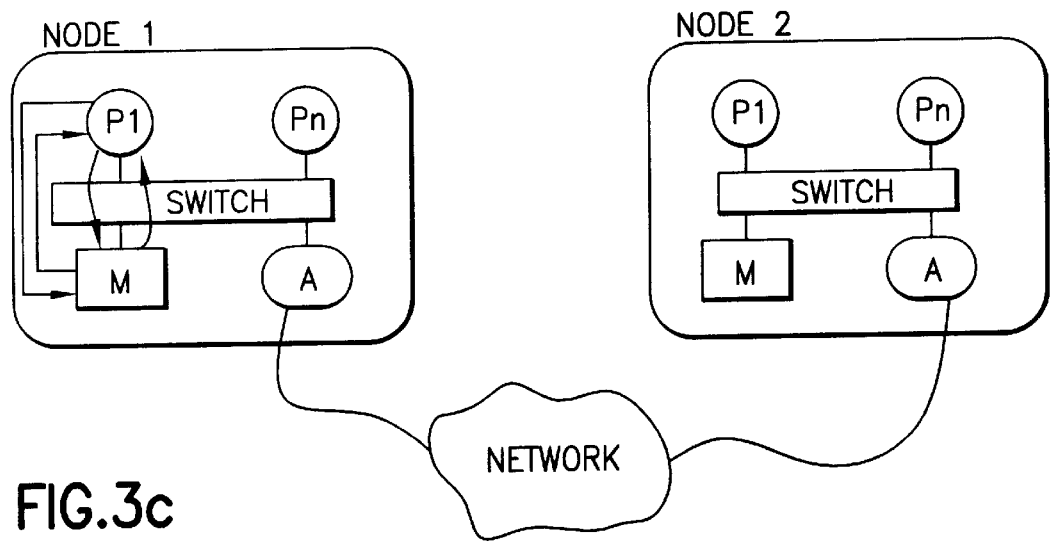

The adapter connects to the switch and plays the role of either a memory or a processor. The behavior of the adapter is different for different memory lines. When a line is homed at the local memory of the node, the adapter behaves as a proxy processor for that line. When a line is homed at the memory of a remote node, the adapter behaves as a proxy memory for that line. These roles are illustrated in FIGS. 3A–3C and are elaborated further below.

Figure 4:
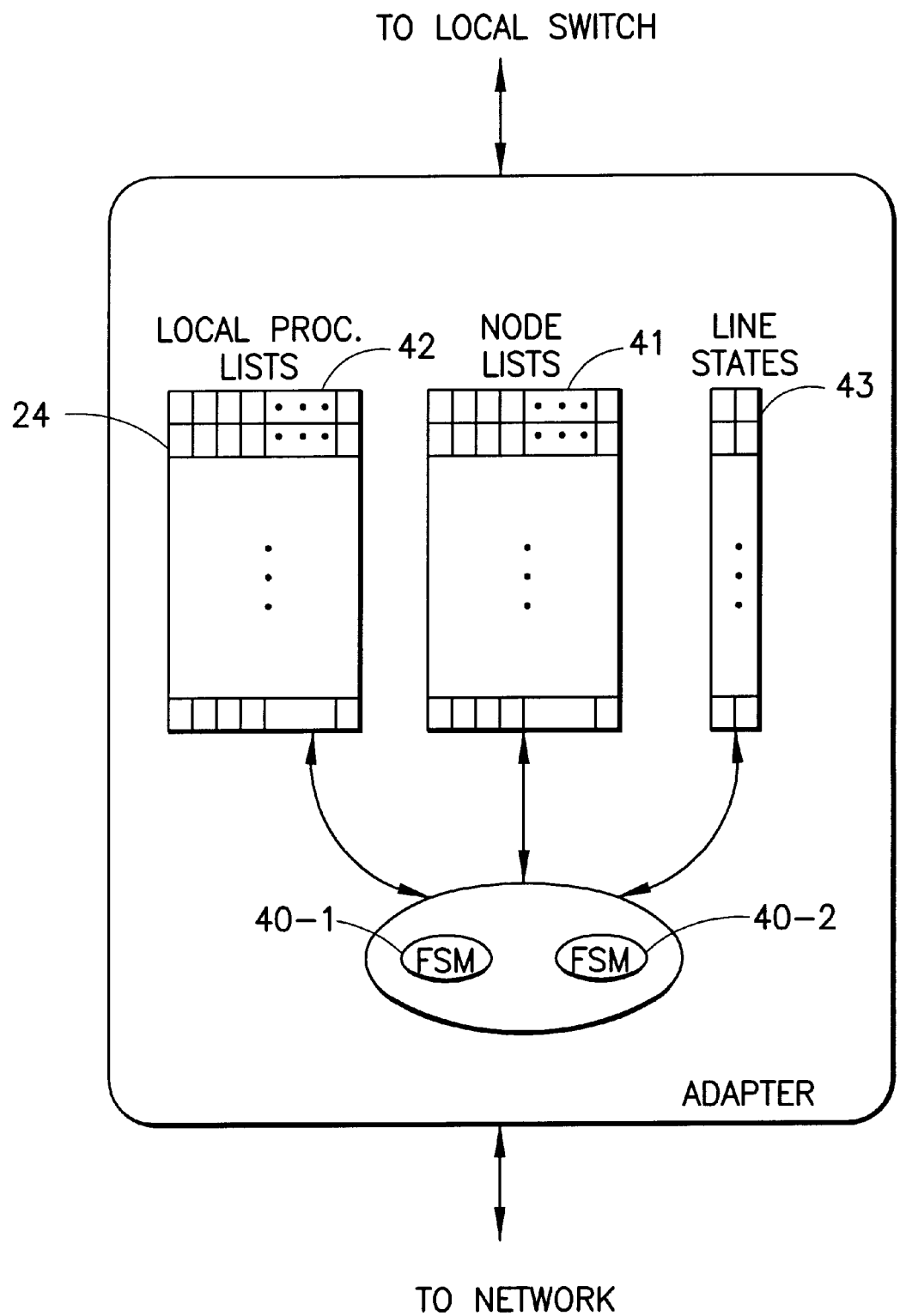
FIG. 4 schematically illustrates the major components of the adapter that are pertinent to this invention.

FIG. 4 illustrates the internal structure of the adapter that enables it to extend cache-coherent shared memory across multiple nodes. It comprises a set of node lists 41 and local processor lists 42. List 41 is maintained for each line of local memory that is cached at a remote node, and list 42 is maintained for each line of remote memory that is cached by a local processor. It also maintains a 2-bit line state directory 43 for lines that are cached by the local processors. The finite state machine (FSM) 40-1 and 2 runs the cache coherence protocol to keep the copies of the lines coherent. When the adapter acts as a proxy processor for a line, it uses the node list associated with the line to determine the remote nodes that need to be notified for coherence actions. When the adapter acts as a proxy memory for a line, it uses the local processor list associated with the line to determine the local processors that need to be notified for coherence actions.

Proxy Processor

In a node in which a line is homed in the local memory, the adapter plays the role of a proxy processor representing the accesses to the line made by the processors in other nodes of the system. In this role, the adapter maintains a state for the line and the list of all nodes sharing that line. The state can be I (indicating that no other node has this line), E (indicating that some other node has exclusive copy of this line) or S (indicating that this line is shared by this and other nodes). As a proxy processor, the adapter receives requests from other adapters and performs the reads and writes in this node on their behalf. Whenever a local processor requires exclusive access to the line while it is in shared state, it communicates with other adapters and invalidates the line in all other nodes. When another node requests for exclusive copy of the line. The adapter only invalidates the copies in all other nodes, but also requests the local memory to grant the exclusive access. The memory controller treats the adapter as another processor.

Proxy Memory

In a node in which a line is homed at a remote memory, the adapter acts as a proxy memory. It captures all the transactions for the corresponding address and runs the memory protocol. In this role, the adapter maintains a state for the line and the list of local caches sharing the line. The state can be I (indicating that no local cache this line), E (indicating that some local cache has exclusive copy of this line) or S (indicating that this line is shared by this and other nodes). As a proxy memory, the adapter responds to all requests to the line and obtains the contents of the line from the remote node (where that line is backed by memory) and supplies the contents to the local caches. It performs the usual coherence control operations in the node and coordinates with other adapters. In order to maintain global coherence, it may have to issue some bus transactions as a master, as illustrated later.

FIGS. 3A–3C present examples of memory accesses that involve the adapter as a proxy processor or memory. In FIG. 3(a), a processor issues a memory command to a line that is mapped to a remote memory. The adapter in the issuing processor's node acts as a proxy memory and retrieves the line from the remote memory. It sends a message to the adapter at the remote memory's node requesting the memory command be performed there. The adapter at the remote memory's node acts as a proxy processor and issues the original memory command at the remote node.

In FIG. 3(b), a processor issues a memory command to a line that is mapped to local memory. The directory in the local memory indicates that the line is cached at a processor, which is in fact the adapter playing the role of a proxy processor. The line needs to be invalidated, hence the local memory sends a command directly to the adapter. The adapter consults its node list for the line to determine which remote nodes to forward the invalidations to, and sends a message to all such nodes. The adapter at the remote node acts as a proxy processor and consults its local processor list and issues invalidation commands over the switch to each of the processors in the list.

In FIG. 3(c), a processor issues a memory command that can be satisfied locally without involving remote nodes. In this case, the directory in the local memory does not point to the adapter so that the adapter is not involved in the memory command. Contrast this situation with that of a bus-based SMP system where the adapter still has to participate in the memory command even if the command can be satisfied locally.

We now elaborate on the two roles of the adapter for CC-NUMA and S-COMA systems.

CC-NUMA

Figure 5:
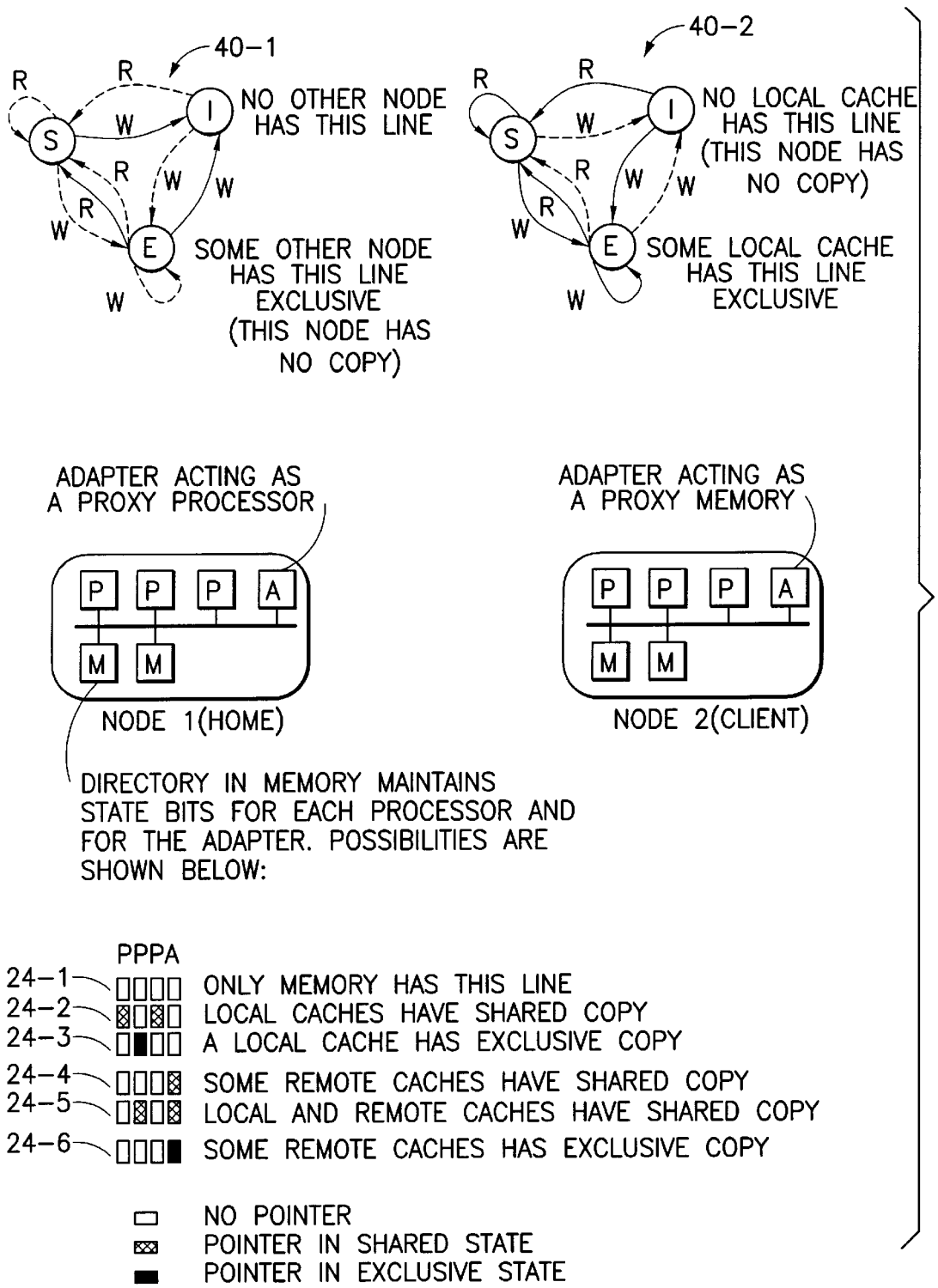
FIG. 5 schematically illustrates the possible directory states for a memory line and the state transitions followed by the finite state machine in the adapter.

In a CC-NUMA system, the adapters behave as shown in FIG. 5. The figure shows the adapter in node 1 acting as a proxy processor and adapter in node 2 acting as a proxy memory for a line that is backed up by a memory in node 1. The state diagrams show how each adapter keeps track of the state of the line when handling local requests (shown by solid arcs) and remote requests (shown by dashed arcs)

Each line has a single node, called its home node, where it is backed up in the memory. All other nodes, called client nodes, can only have copies of it in their caches, but not in their memories. The home node adapter for a line acts as proxy processor for that line and a client node adapter acts as a proxy memory for that line. The actions of the adapters in the two nodes are summarized below:

In the FSM 40-1 at the top left of FIG. 5 at the home node (NODE 1):

1. The memory controller maintains a directory for the line, containing the list of processors within that node that share (or have a cache copy) the line. The adapter is treated as just another processor sharing the line. FIG. 5 shows different samples of the directory 24, indicated by 24-1 through 24-6, of a four entry list of processors. Sample 24-1 illustrates the case where the list of processors is empty. An empty list indicates that no processors have cached the line. In the Sample 24-2, two local processors have copies of the line in their caches as indicated by the boxes having x's inside. Sample 24-3 indicates that only a single processor has an exclusive copy of line in its cache. See the solid black box in the list of processors 24-3. In sample 24-4, the list of processors includes a local adapter, which means that the adapter is active is acting as a proxy processor for that line. Since the adapter is acting is acting as a proxy processor, at least one remote processor must have a copy of the line in its cache. In sample 24-5 the list of processors includes both an adapter and a local processor. Thus, the list of 24-5 indicates that a local processor and at least one remote processor have copies of the line in its cache. Finally, sample 24-6 indicates that the local adapter has an exclusive copy of the line. Sample 24-6 indicates that a remote processor has an exclusive copy of the line in its cache.

2. The adapter maintains the state of the line (see top left side of FIG. 5). The state I indicates that no other node has this line, state E indicates that some other node has exclusive copy of this line and state S indicates that this line is shared by this and other nodes.

3. The adapter maintains the list of nodes that share the line.

The following description of state transitions use the following format current state→[memory command/action response]
        →next state and 'rwitm' stands for 'read with intent to modify'.

The "current owner" refers to the processor with the exclusive cache copy of the line.
Transitions: (See state diagram on top left of FIG. 5)

I→[remote read/read locally and send data]→S
I→[remote write/rwitm locally and send data]→E
S→[remote read/read locally and send data]→S
S→[remote write/rwitm locally, invalidate in other nodes and send data]→E
S→[local write/invalidate in all other nodes]→I
E→[remote read/send read to current owner, send data]→S
E→[remote write/send rwitm to current owner, send data]→E
E→[local read/send read to current owner, supply data to local]→S
E→[local write/send rwitm to current owner, supply data to local]→I In the FSM 40-1 at the top right of FIG. 5 at the client node (NODE 2):

1. The adapter maintains the state of the line—state I indicates that no local cache this line, state E indicates that some local cache has exclusive copy of this line and state S indicates that this line is shared by this and other nodes.

2. The adapter maintains the list of local caches that share the line. (Bus based systems can eliminate this.)
Transitions: (See state diagram on top right of FIG. 5)

I→[local read/get data from home and supply to local]→S
I→[local write/get excl access from home and supply data to local]→E
S→[local read/get data from home or use shared intervention]→S
S→[local write/get excl access from home and supply data]→E
S→[remote write/issue rwitm locally and send data]→I
E→[local read/supply data or use Cache to Cache transfer]→S
E→[local write/supply data or use Cache to Cache transfer]→E
E→[remote read/issue local read and send data]→S
E→[remote write/issue rwitm locally and send data]→I

S-COMA

Figure 6:
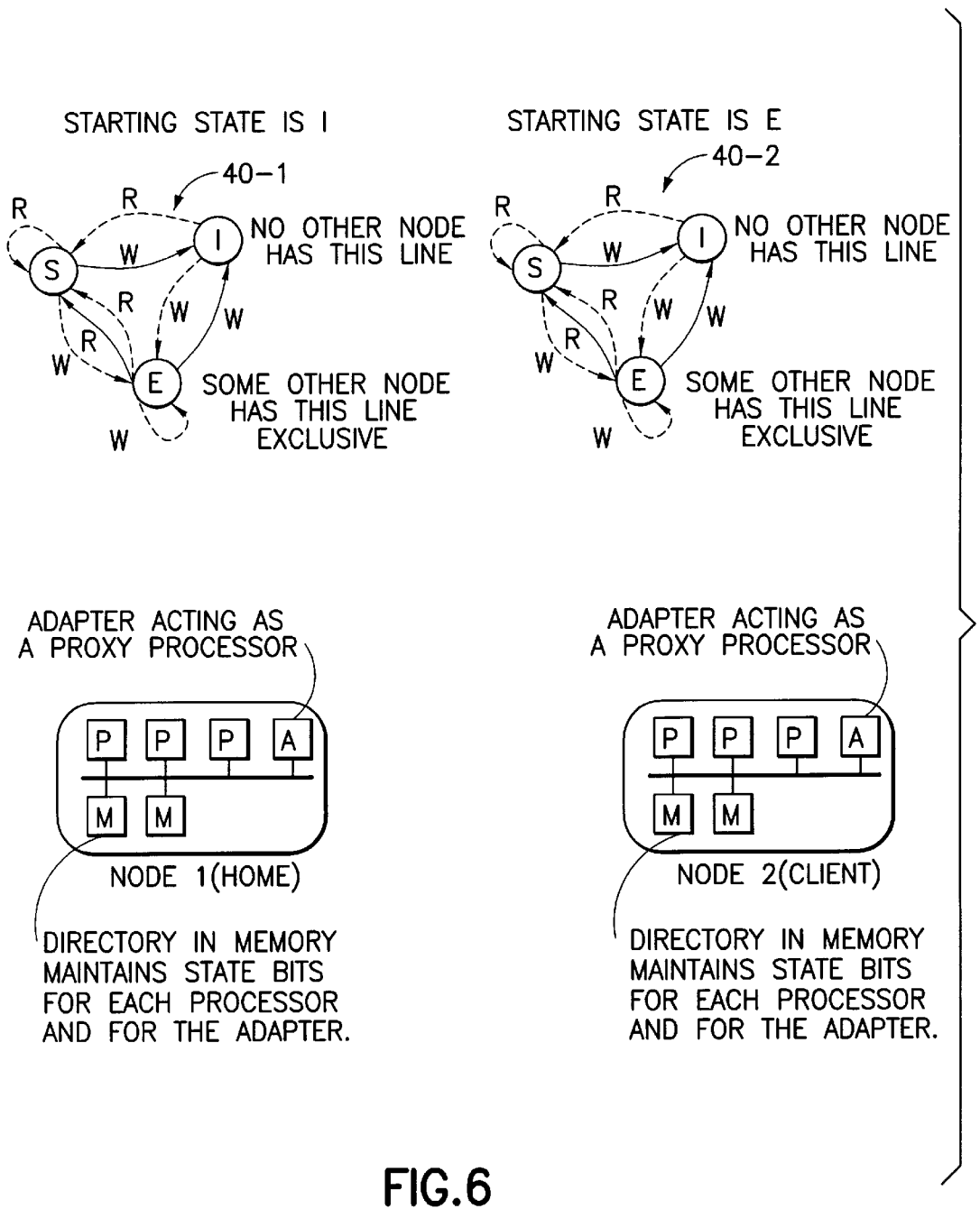
FIG. 6 schematically illustrates the state transitions followed by the finite state machine in the adapter for implementing an S-COMA system.

Referring to FIG. 6, in an S-COMA system also, each line has a single home node which is responsible for keeping a consistent copy of the line. However, every client node that shares a copy of the line backs it up into its local memory. Thus, when a line is present in many nodes, the memory in each of those nodes maintains a directory entry for that line. The memory in each node maintains a local directory for a line shared by processors within that node. The adapter at the home node maintains the list of nodes sharing that line.

The adapter in each of these nodes acts as a proxy processor for that line. To invalidate a line from the node, the adapter issues an RWITM thereby preventing the local memory from giving the line out to any local caches. The adapter for the home node starts in the I state indicating that the local memory has the valid copy and that no other node has a valid copy. A client adapter starts in the E state indicating that the local memory (or caches) have no valid copy and that only one other node has a valid copy. The actions of the adapters in the two nodes are summarized below:

In Each Node:

1. The memory controller maintains a directory for the line, containing the list of processors within that node that share the line. The adapter is treated as just another processor sharing the line.

2. The adapter maintains the state of the line—The state I indicates that no other node has this line, state E indicates that some other node has exclusive copy of this line and state S indicates that this line is shared by this and other nodes.

3. FSM 40 transitions are the same as in CC-NUMA home node.

In the FSM 40-1 at the top left of FIG. 6 at the Home Node (NODE 1)::

1. The adapter initializes the state of the line to I.
2. The adapter maintains the list of nodes that share the line.

In the FSM 40-2 at the top right of FIG. 6 at the Client Node (NODE 2):

1. The adapter initializes the state of the line to E.

Directory Size in Memory Controller

In an SMP node, the directory in the memory controller needs to have an entry for a line only when the line is present in the cache of at least one processor. Lines that are not present in any cache are stored in memory and hence no directory entry is needed for those lines. Thus, the size of the directory at any time does not exceed the total size of all caches in the node. Usually this maximum (i.e. the total size of all caches in the node) is much smaller than the total memory at that node.

However, with the adapter design described above for a CC-NUMA system, the memory controller sees the adapter as another processor and if a line is present in any cache of any other node, the memory controller acts as if the line is present in the (imaginary) cache of the adapter. Thus, the maximum directory size needed is the sum of the sizes of all caches in all nodes of the system. Thus the demand for directory storage increases with the size of the system.

In the S-COMA system described above, the directory storage required is even larger. The memory controller may have to keep the directory entry for a line, even when the line is not present in any cache of any node in the system. This is because, the line may be stored in the local memories of the nodes (treated as L3 caches). Thus the maximum directory size required is proportional to the total size of memory in a node. This can be quite large.

Figure 7:
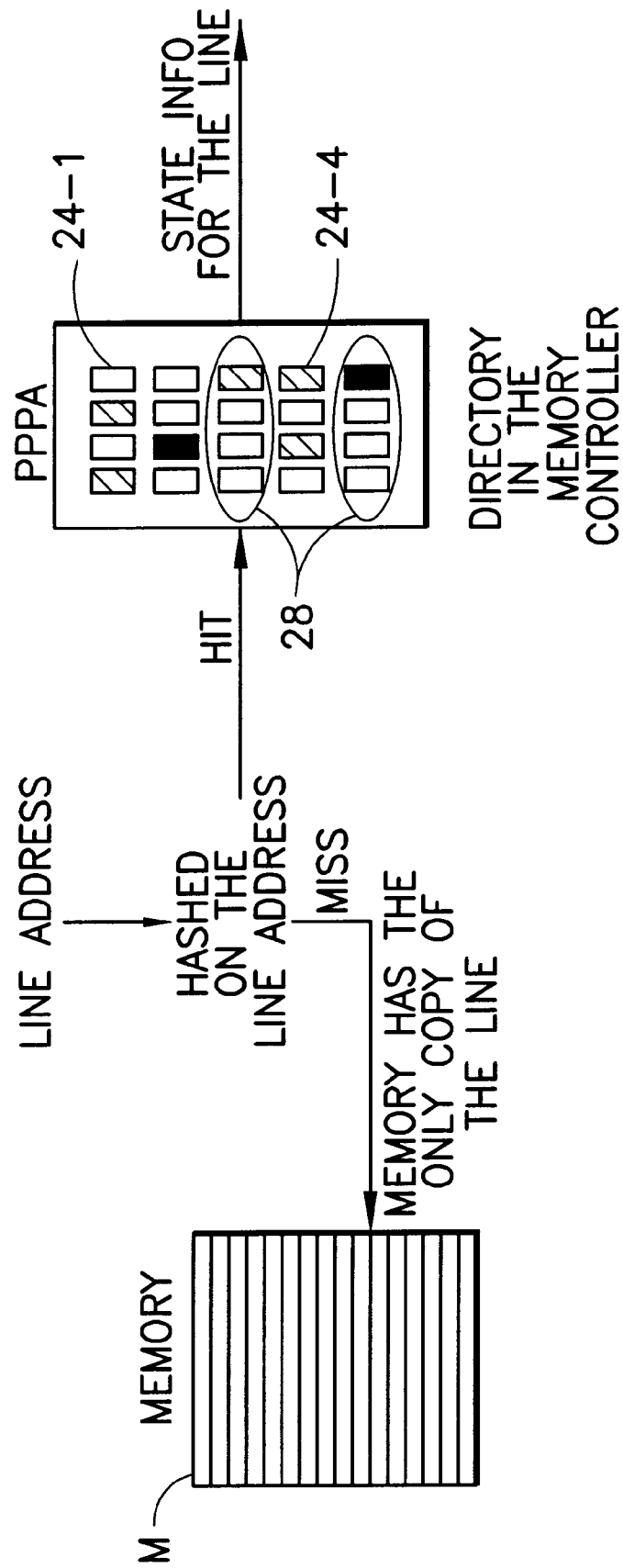
FIG. 7 schematically illustrates a directory organization in a memory module in a switch-based SMP where directory entries are dynamically allocated for each line that is cached by some processor.

Consider a memory controller (as depicted in FIG. 7) that maintains the directory in a limited amount of storage. It can work as follows: It allocates storage for an entry on demand. When the capacity exceeds, some line is evicted from all the caches and stored in the memory. Since that line need not have a directory entry, its storage is used for some other entry.

Memory Controllers can manage with a small directory since they need to keep an entry only for lines that are out in some cache. The addresses for such lines are hashed and HIT in the directory. Having no entry in the directory is interpreted to mean that memory has the only copy of the line. The addresses of these lines are hashed and MISS in the directory. Thus, the size of the directory is proportional to the total amount of cache supported for this memory.

The above strategy presents a problem when used in conjunction with the proposed adapter. To evict a line, the memory controller must issue an invalidate to the adapter also. But evicting the line from the adapter implies that the line must be invalidated in all other nodes in the system. Thus each time the memory controller evicts a line (because of limited capacity of directory storage), the line is brought into that node in an exclusive manner, invalidating all other outside copies. This is highly undesirable. We can alleviate this problem, with the following modifications to the memory controller.

Additional State in the Memory Controller

Figure 8:
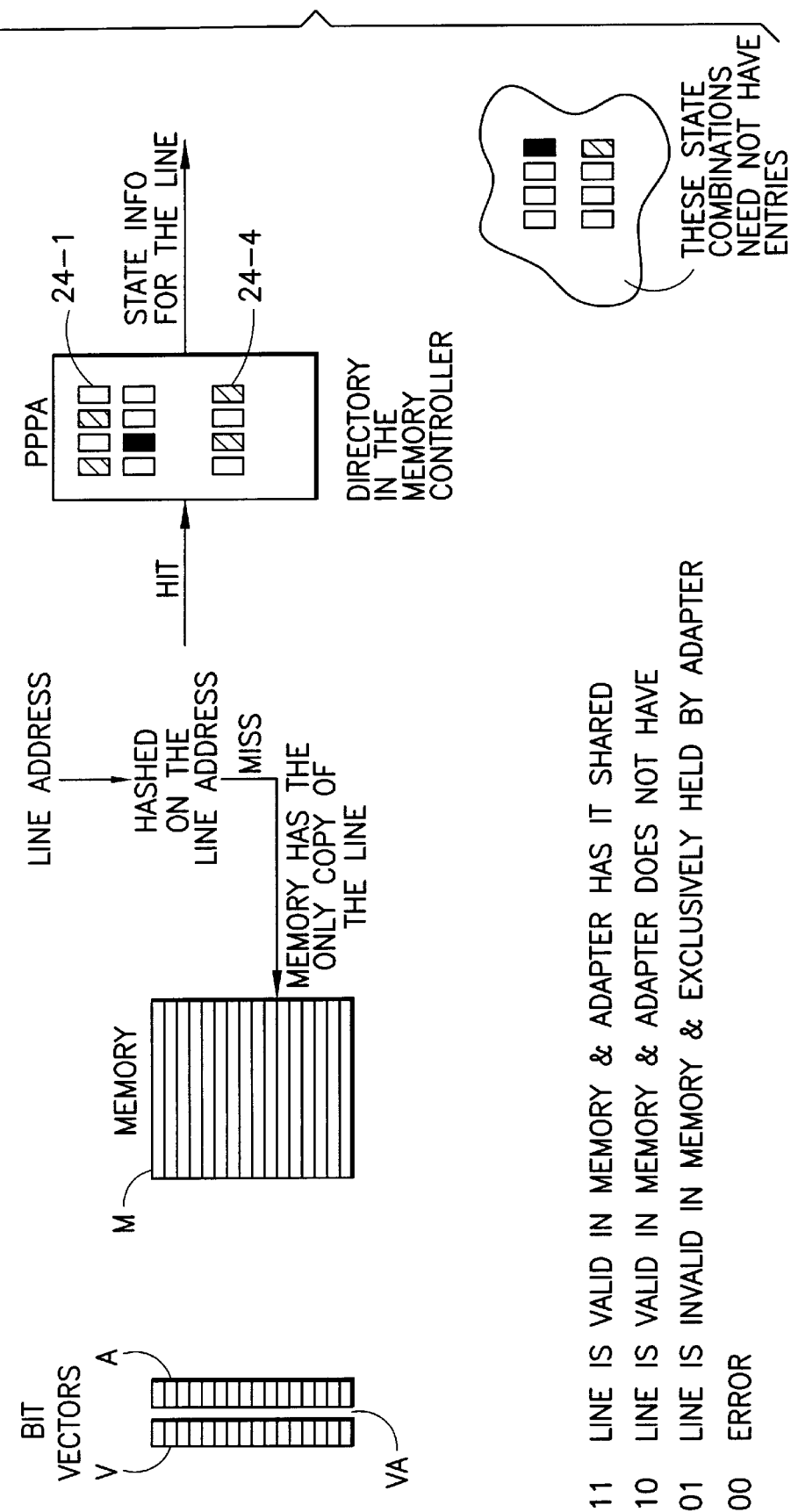
FIG. 8 schematically illustrates a modification to a memory module in a switch-based SMP that reduces the directory space requirements.

When the directory entry for a line is to be evicted, there is only a small amount of state information the memory must remember to reconstruct the entry. It must know (a) whether the contents of the memory location are valid or not and (b) whether the adapter has any exclusive/shared copies of this line. If this information (perhaps using 2 bits per line) can be kept by a memory controller for each line, then the finite directory storage strategy outlined above can be made to work. The strategy is illustrated in FIG. 8. By adding additional information structure that comprises 2 bits (VA) per memory line, it is possible to use a small directory. The following actions are taken when a line is accessed:

Directory entry for the line is present: Normal protocol takes place without any change.

Directory entry for the line is not present: Create a new directory entry for this line. Read the VA bits from the bit vector and set the state bits according to VA bits (3 possibilities: VA=10 means the adapter does no have it, i.e., no remote nodes have cached the line. VA=11 means adapter has it in shared mode and VA=01 means adapter has it in exclusive mode). Now do the normal processing using the directory entry.

Directory entry is to be evicted: When a directory entry is to be evicted (because of low capacity), invalidate commands are issued to all the caches within the node and the data is stored in the memory location. The VA bits are set accordingly (VA is set to 10 if the adapter currently has no copy (i.e., no other node has a copy), VA is set to 11 if the adapter currently has a shared copy, and VA is set to 01 if the adapter currently has an exclusive copy). Thus, maintenance of the VA bits enable the elimination of the directory entries 28 shown in FIG. 8. See entries 28 in the directory of the memory controller of FIG. 7.

Having thus described our invention, what we claim as new and desire to secure by Letters Patent is:

1. In a computer system having a plurality of interconnected shared memory multiprocessor nodes, each of said nodes having at least one processor and a memory, a method of providing coherent shared memory access from any of said processors to any of said memories of said system, said method comprising:

a. for each line of data in each memory of each node, maintaining a list of those of said processors of said node that have said line in their caches;
   b. if a memory command is issued from one of said processors of one of said nodes, and if said command is directed to a memory of another node of said system, then sending said memory command directly to an adapter of said one node;
   c. when said adapter receives said command, forwarding said command from said adapter to another adapter of said other node;
   d. when said other adapter receives said command, forwarding said command from said other adapter to a local memory of said other node;
   e. updating said list of processors in said local memory of said other node to include or exclude said other adapter.
   f. if a memory command is issued from one of said processors of one of said nodes, and if said command is directed to a memory of latter said one node, then sending said memory command directly to said local memory;
   g. when said local memory receives said command, and if an adapter of latter said one node is in said list of processors for a line associated with latter said command, then forwarding said command to latter said adapter;
   h. when latter said adapter receives said command, forwarding said command to one or more adapters of remote nodes which have cache copies of said line; and
   i. when said adapters of remote nodes receives said command, forwarding said command to one or more processor of said remote nodes.

2. A method as recited in claim 1, wherein each said adapter comprises a list of nodes of said system for each line of data in its local memory, and wherein said list of nodes includes those nodes of said system that have cache copies of said each line.

3. A method as recited in claim 1, wherein, for each line of remote memory, each adapter of each node comprises a list of local processors which have cache copies of each line of remote memory.

4. A method as recited in claim 1, wherein each adapter comprises a state machine which maintains four states for each line of local memory and for each remote line of remote memory having cache copies in a local node of said adapter, and wherein each state is used to indicate whether an associated cache line is valid and/or writable.

5. A method as recited in claim 1, wherein the storage required for said list of processors in each line is reduced by using at least two bits to indicate that remote nodes contain cache copies of said each line.

6. A program storage device readable by a machine, tangibly embodying a program of instructions executable by the machine to perform method steps for providing coherent shared memory access from any of processors to any of memories of a computer system, said method comprising:

a) for each line of data in each memory of each node, maintaining a list of those of said processors of said node that have said line in their caches;

b) if a memory command is issued from one of said processors of one of said nodes, and if said command is directed to a memory of another node of said system, then sending said memory command directly to an adapter of said one node;

c) when said adapter receives said command, forwarding said command from said adapter to another adapter of said other node;

d) when said other adapter receives said command, forwarding said command from said other adapter to a local memory of said other node;

e) updating said list of processors in said local memory of said other node to include or exclude said other adapter.

f) if a memory command is issued from one of said processors of one of said nodes, and if said command is directed to a memory of latter said one node, then sending said memory command directly to said local memory;

g) when said local memory receives said command, and if an adapter of latter said one node is in said list of processors for a line associated with latter said command, then forwarding said command to latter said adapter;

h) when latter said adapter receives said command, forwarding said command to one or more adapters of remote nodes which have cache copies of said line; and i) when said adapters of remote nodes receives said command, forwarding said command to one or more processor of said remote nodes.

7. A computer program product for providing coherent shared memory access from any of a plurality of processors to any of a plurality of memories of a computer system, said computer program product comprising:

for each line of data in each memory of each node, first instruction means for maintaining a list of those said processors of said node that have said lines in their caches;

if a memory command is issued from one of said processors of one of said nodes, and if said command is directed to a memory of another node of said system, second instruction means for then sending said memory command directly to an adapter of said one node;

third instruction means for, when said adapter receives said command, forwarding said command from said adapter to another adapter of said other node;

fourth instruction means for, when said other adapter receives said command, forwarding said command from said other adapter to a local memory of said other node;

fifth instruction means for updating said list of processors in said local memory of said other node to include or exclude said other adapter;

sixth instruction means for, if a memory command is issued from one of said processors of one of said nodes, and if said command is directed to a memory of latter said one node, then sending said memory command directly to said local memory;

seventh instruction means for, when said local memory receives said command, and if an adapter of latter said one node is in said list of processors for a line associated with latter said command, then forwarding said command to latter said adapter;

eighth instruction means for, when latter said adapter receives said command, forwarding said command to one or more adapters of remote nodes which have cache copies of said line, and ninth instruction means for, when said adapters of remote nodes receives said command, forwarding said command to one or more processor of said remote nodes.

* * * * *